US 7,028,116 B2

(12) United States Patent
Shah

(10) Patent No.: US 7,028,116 B2
(45) Date of Patent: Apr. 11, 2006

(54) ENHANCEMENT OF TRANSACTION ORDER QUEUE

(75) Inventor: Paras A. Shah, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 553 days.

(21) Appl. No.: 09/779,424

(22) Filed: Feb. 8, 2001

(65) Prior Publication Data

US 2002/0108004 A1 Aug. 8, 2002

(51) Int. Cl.
*G06F 13/00* (2006.01)

(52) U.S. Cl. ..................................... 710/112; 711/145

(58) Field of Classification Search ............... 710/268, 710/310, 305–309, 313, 112–114; 711/145
See application file for complete search history.

(56) References Cited

U.S. PATENT DOCUMENTS

| 5,996,036 | A  | * | 11/1999 | Kelly ......................... 710/110 |
| 6,032,231 | A  | * | 2/2000  | Gujral ........................ 711/145 |
| 6,175,889 | B1 | * | 1/2001  | Olarig ........................ 710/309 |
| 6,477,610 | B1 | * | 11/2002 | Willenborg ................. 710/310 |
| 2002/0083247 | A1 | * | 6/2002 | Shah .......................... 710/112 |

* cited by examiner

*Primary Examiner*—Rehana Perveen
*Assistant Examiner*—Clifford Knoll

(57) ABSTRACT

A technique for an enhanced transaction order queue is disclosed. A transaction order queue is used to prioritize transactions flowing through a bridge. The present technique enhances the transaction order queue by providing logic within a module, facilitating the enqueuing of a plurality of transaction entries within a single device and ensures that PCI/PCI-X ordering rules are not violated. The technique also provides that the logic device within the PCI-X bridges and buses selects and enqueues a single transaction entry from simultaneous multiple transaction entries.

27 Claims, 4 Drawing Sheets

FIG_2

ENHANCEMENT OF TRANSACTION ORDER QUEUE

FIELD OF THE INVENTION

The present invention relates generally to an enhancement of a transaction order queue. Particularly, the present invention facilitates the queueing of many transaction entries within a single device and ensures that PCI/PCI-X ordering rules are not violated.

BACKGROUND OF THE RELATED ART

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A conventional computer system typically includes one or more central processing units (CPUs) and one or more memory subsystems. Computer systems also typically include peripheral devices for inputting and outputting data. Some common peripheral devices include, for example, monitors, keyboards, printers, modems, hard disk drives, floppy disk drives, and network controllers. The various components of a computer system communicate and transfer data using various buses and other communication channels that interconnect the respective communicating components.

One of the important factors in the performance of a computer system is the speed at which the CPU operates. Generally, the faster the CPU operates, the faster the computer system can complete a designated task. Another method of increasing the speed of a computer is using multiple CPUs, commonly known as multiprocessing. With multiple CPUs, tasks may be executed substantially in parallel as opposed to sequentially.

However, the addition of a faster CPU or additional CPUs can result in different increases in performance among different computer systems. Although it is the CPU that executes the algorithms required for performing a designated task, in many cases, it is the peripherals that are responsible for providing data to the CPU and storing or outputting the processed data from the CPU. When a CPU attempts to read or write to a peripheral, the CPU often "sets aside" the algorithm which it is currently executing and diverts to executing the read/write transaction, (also referred to as an input/output transaction or an I/O transaction) for the peripheral. As can be appreciated by those skilled in the art, the length of time that the CPU is diverted is typically dependent on the efficiency of the I/O transaction.

Although a faster CPU may accelerate the execution of an algorithm, a slow or inefficient I/O transaction process associated therewith can create a bottleneck in the overall performance of the computer system. As the CPU becomes faster, the amount of time it expends executing algorithms becomes less of a limiting factor compared to the time expended in performing an I/O transaction. Accordingly, the improvement in the performance of the computer system that could theoretically result from the use of a faster CPU or the addition of another CPU may become substantially curtailed by the bottleneck created by the I/O transactions. Moreover, it can be readily appreciated that any performance degradation due to such I/O bottlenecks in a single computer system may have a stifling affect on the overall performance of a computer network in which the computer system is disposed.

As the CPUs have increased in speed, the logic controlling the transactions has evolved to accommodate the I/O transactions. Such logic, usually referred to as a "bridge," is typically an application specific integrated circuit (ASIC). For example, Peripheral Component Interconnect (PCI) logic was instilled within buses and bridges to govern transactions between a peripheral device and the CPU.

Today, PCI logic has evolved into the Peripheral Component Interconnect Extended (PCI-X) to form the architectural backbone of the computer system. PCI-X logic has features that improve upon the efficiency of communication between peripheral devices and the CPU. For instance, PCI-X technology increases bus capacity to more than eight times the conventional PCI bus bandwidth. For example, a 133 MB/s system with a 32 bit PCI bus running at 33 MHz is increased to a 1066 MB/s system with the 64 bit PCI bus running at 133 MHz. An additional feature of the new PCI-X logic is that it can provide backward compatibility. Backward compatibility refers to a feature where PCI enabled logic devices may be operable with systems incorporating PCI-X logic. However, the bus enabling the PCI device will operate at the slower PCI speed even though PCI-X devices may be located on the same bus.

As PCI-X logic is incorporated into the next generation of buses and bridges, it becomes important to handle transactions efficiently. Generally, peripheral devices initiating transactions will target the PCI-X bridge or a host bridge. As a transaction is initiated, a buffer is allocated within the bridge. The bridge stores the information about the transaction, such as its starting address, length and so on. Thus, the PCI-X bridge stores the transaction and replies to the requesting agent according to priority.

Transaction order queues (TOQ) may be utilized to prioritize transactions flowing through a bridge. Generally, TOQs process large quantities of transactions, typically greater than twenty; however only one entry can be enqueued in a particular clock cycle. This limitation is problematic in applications in which multiple transactions may be received in a single clock cycle. There are applications when a requestor may request multiple unrelated transactions in a single clock cycle. In these situations, the enhancement described below maintains transaction ordering while allowing multiple transaction entries to be stored.

The present invention may be directed to one or more of the problems set forth above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a method whereby a transaction order queue is used to prioritize transactions flowing through a bridge. The method manages a combinational decode and ordering logic device, which selects a single transaction entry to send to the main transaction order queue. Due to the ordering rules, posted write transactions are selected first, if present. After posted writes, either delayed/split transactions or read completions transaction entries may be sent to the TOQ. In this particular embodiment, the combinational decode and ordering logic device operates to prioritize read completion transactions before delayed/split transactions. Entries for read completions transactions are selected and then delayed/split transactions after processing posted write transactions. Furthermore, the present technique enqueues one transaction entry into the TOQ per clock cycle.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
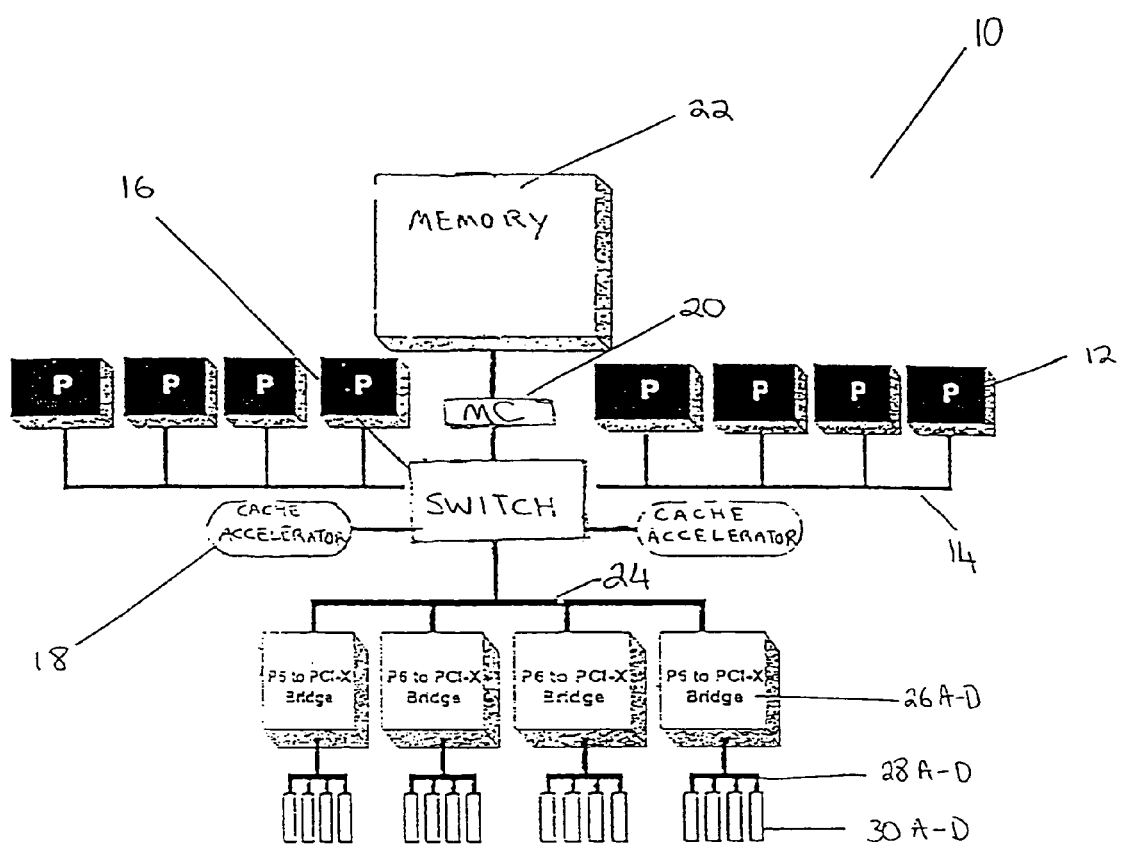
FIG. 1 illustrates a diagram of an exemplary computer system in accordance with the present invention.

Turning now to the drawings, and referring initially to FIG. 1, a multiprocessor computer system, for example a Proliant 8500 PCI-X from Compaq Computer Corporation, is illustrated and designated by the reference numeral 10. In this embodiment of the system 10, multiple processors 12 control many of the functions of the system 10. The processors 12 may be, for example, Pentium, Pentium Pro, Pentium II Xeon (Slot-2), or Pentium III processors available from Intel Corporation. However, it should be understood that the number and type of processors are not critical to the technique described herein and are merely being provided by way of example.

Typically, processors 12 are coupled to a processor bus 14. As instructions are sent and received by the processors 12, the processor bus 14 transmits the instructions and data between the individual processors 12 and a switch 16. The switch 16 directs signals between the processor bus 14, cache accelerator 18, and a memory controller 20. A crossbar switch 16 is shown in this embodiment, however, it should be noted that any suitable type of switch may be used. When the data is retrieved from the memory 22, the instructions are sent via the memory controller 20. The memory controller 20 may be of any type suitable for such a system, such as a Profusion memory controller. It should be understood that the number and type of memory, switches, memory controllers, and cache accelerators are not critical to the technique described herein, and are merely being provided by way of example.

The memory 22 in the system 10 is generally divided into groups of bytes called cachelines. Bytes in a cacheline may comprise several variable values. Cachelines in the memory 22 are moved to a cache for use by the processors 12 when the processors 12 request data stored in that particular cacheline.

The switch 16 is also coupled to an I/O bus 24. As mentioned above, the switch 16 directs data to and from the processors 12 through the processor bus 14, and either the cache accelerator 18 or the memory 22 though the use of the memory controller 20. In addition, data may be sent through the I/O bus 24 to multiple PCI-X bridges 26 A–D. The I/O bus 24, in this embodiment, is shown coupled to PCI-X bridges 26 A–D. Further, each PCI-X bridge 26 A–D is coupled to multiple PCI-X buses 28 A–D. Finally, each PCI-X bus 28 A–D terminates at a series of slots or I/O interfaces 30 A–D.

The PCI-X bridges 26 A–D contain logic that processes input/output transactions. Generally, ASICs are the implementation of the PCI-X bridges 26 A–D. The PCI-X bridges 26 A–D may include address and data buffers, as well as arbitration and bus master control logic for the PCI-X buses 28 A–D. The PCI-X bridges 26 A–D may also include miscellaneous logic, such as counters and timers as conventionally present in personal computer systems, an interrupt controller for both the PCI and I/O buses, and power management logic.

Generally, a transaction is initiated by a requester, e.g., a peripheral device, via the I/O interface 30 A–D. The transaction is then sent to one of the PCI-X buses 28 A–D depending on the peripheral device utilized and the location of the I/O interface 30 A–D. The transaction is then directed towards the PCI-X bridge 26 A–D. Logic devices within the bridge 26 A–D generally allocate a buffer where data returned from the memory 22 may be stored. Once the buffer is allocated, the transaction request is directed towards the processor 12 and then to the memory 22. Once the requested data is returned from the memory 22, the data is stored within the respective bridge 26 A–D. The logic device within the bridge 26 A–D operates to read and deliver the data to the requesting peripheral device. As mentioned above, if the transaction is conducted through a peripheral device that is not PCI-X enabled, the PCI-X buses 28 A–D and the PCI-X bridges 26 A–D administer the transaction request using PCI specifications. Tape drives, CD-ROM devices, or other peripheral devices may be connected to the slots or I/O interfaces 30 A–D.

As mentioned above, the bridge 26 A–D may be an ASIC chip that contains logic that operates many of the functions described here. For instance, logic programmed within the ASIC chip controls the buffer read function. Furthermore, the ASIC chip may also contain logic specifying ordering rules, buffer allocation, specifying transaction type, and logic for receiving and delivering data.

The bridge 26 A–D may receive multiple simultaneous transactions which requires the modifying of a transaction order queue. Typically, only one entry can be enqueued in a particular clock cycle. It should be noted that although a single transaction is initiated, the transaction is divided into separate entries to facilitate the data retrieval and delivery process. For example, a read completion transaction may be divided into multiple entries which are transmitted to the TOQ creating the a scenario where multiple entries may be received by the TOQ in a single clock cycle. Further, multiple entries may also be received in a single clock cycle when transactions running at a frequency normal to the processor bus enters the slower running bridge 26 A–D simultaneously.

Figure 2:
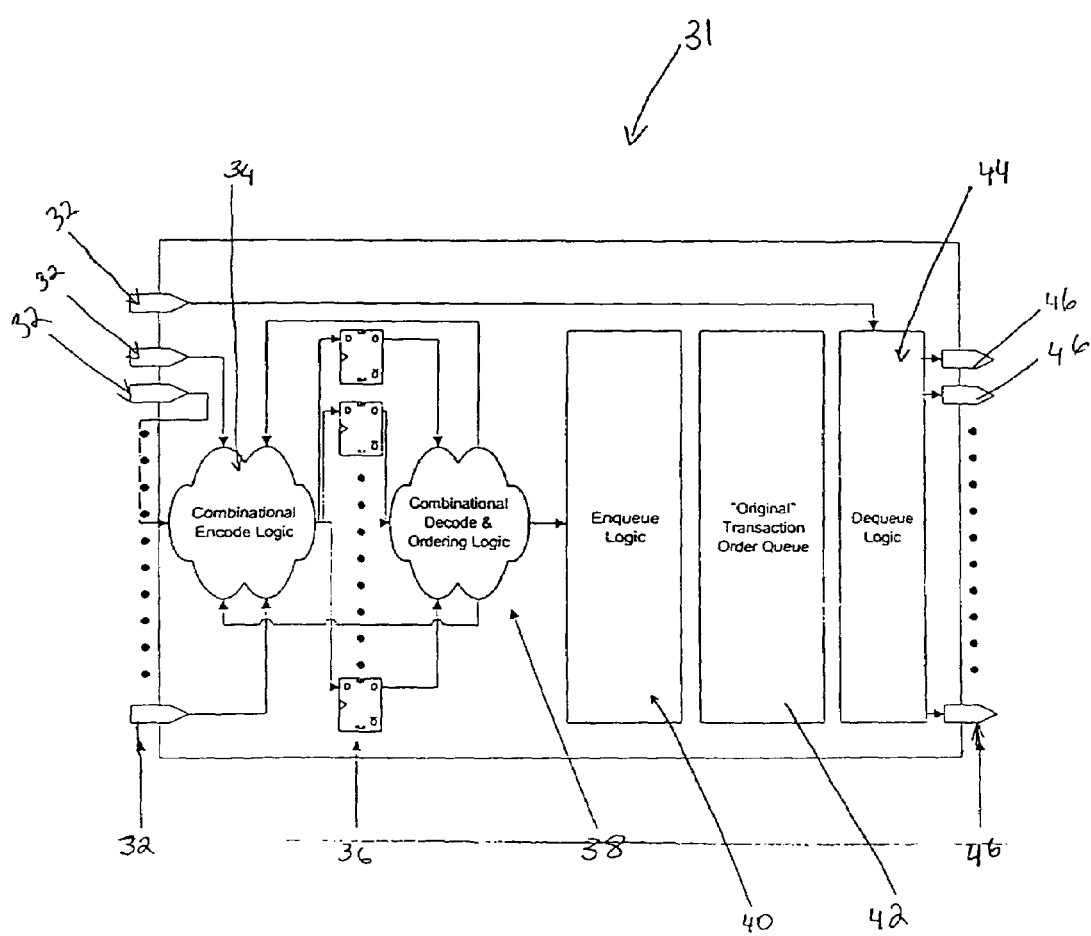
FIG. 2 illustrates a logic diagram of an enhancement to a transaction order queue.

FIG. 2 illustrates a system diagram depicting the logic governing an example of the enhanced transaction order queue (TOQ) 31 that is included within the bridge 26 A–D. In this particular embodiment, transaction entries 32 may be directed to the enhanced transaction order queue 31, where the entries 32 are first received by a combinational encode logic device 34. The combinational encode device 34 directs the transaction entries 32 toward a plurality of registers 36. A more detailed description of the combinational encode device 34 will be discussed below. The registers 36 may be of any type suitable for storing multiple transaction entries 32. It should be noted that these registers 36 do not maintain ordering information, but rather store the transaction entry 32 being initiated, for example, a read completion, posted write, or delayed/split transaction.

The combinational decode and ordering device 38 receives the entries 32 from the registers 36 and prioritizes the entries 32 according to PCI-X specifications. As described in greater detail below, the combinational decode and ordering device 38 delivers the entries 32 according to priority via a logic device 40 for enqueuing to the "original" transaction order queue 42. Generally, a transaction order queue is implemented within the bridge, thus the present invention is an enhancement to that transaction order queue. Therefore, the transaction order queue 42 is referred to as the "original" transaction order queue.

A single entry 32 from the registers 36 is delivered to the logic device 40 every clock cycle. Once the transaction order queue 42 processes the transaction entry 32, it delivers the prioritized entry 32 to the dequeue logic device 44. The dequeue logic device 44 delivers the requested information to the buffer 36 as output 46. Thus, the ordering rules are maintained and the PCI-X transaction is completed within the transaction order queue.

It should be noted that the combinational encode device 34 and the combinational decode and ordering device 38 may be fabricated as part of the application specific integrated circuit that functions in concert with the enhanced transaction order queue 31. It should also be noted that the transaction entry 32 is transmitted from the buffer 36 containing information regarding the type of transaction and the location at which the transaction is located within the buffer 36. Generally, a transaction entry contains five bits of data which identifies the transaction. Specifically, two bits refer to the type of transaction and the three additional bits identify the location of the transaction data within the buffer 36.

Figure 3:
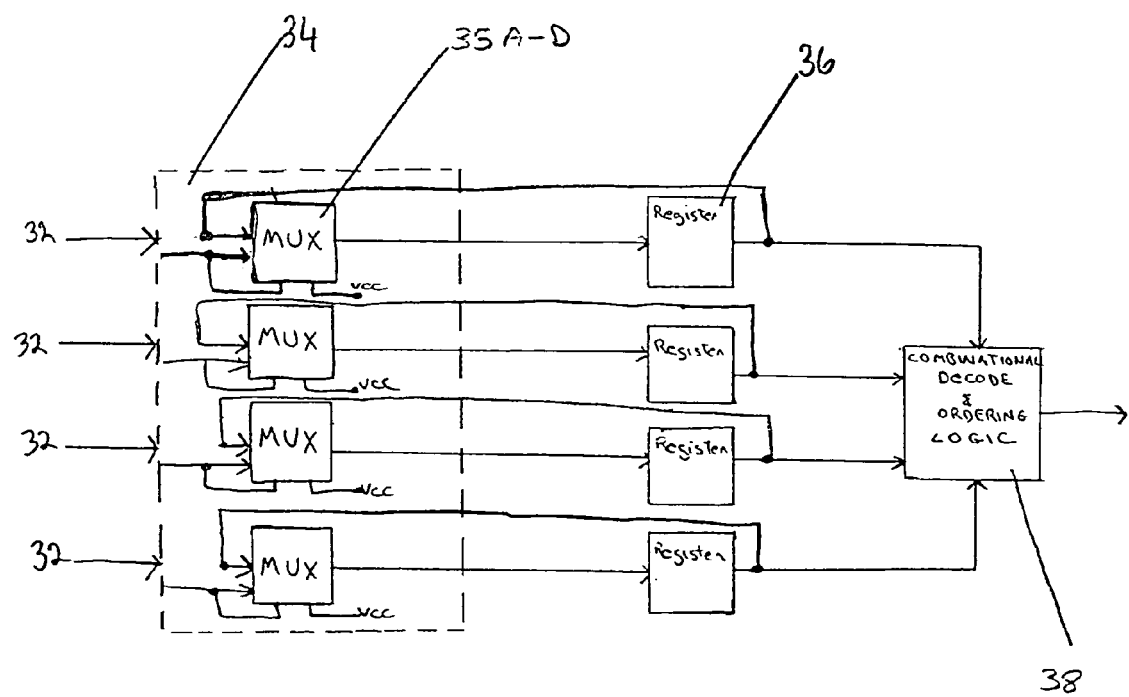
FIG. 3 illustrates elements representative of the combinational encode device with respect to the enhancement of the transaction order queue.

FIG. 3 illustrates the elements operating to process the transaction entries 32 within logic device 34. The combinational encode logic device 34 primarily functions to manage the registers that store the transaction entries 32 efficiently. Combinational encode logic device 34 includes a series of multiplexers 35 A–D, which are adapted to receive multiple simultaneous transaction entries 32. In the present embodiment, multiplexers 35 A–D are configured to preserve transaction entries 32 that are saved within the register 36. However, if the register 36 is available, then a new entry 32 is transmitted to the register 36 via the multiplexer 35 A–D. For example, if the register 36 is holding an entry 32 for a particular clock cycle, then the multiplexer 35 A–D will output the same value for the particular entry 32 until the register 36 is cleared and that particular entry 32 is sent to the combinational decode and ordering logic device 38.

Thus, the multiplexer 35 A–D is adapted to facilitate the input of a new transaction entry 32 or permitting the register 36 to retain the current entry 32 until it is transmitted into the combinational decode and ordering logic device 38. It should be understood that the combinational encode logic 34 does not prioritize the transaction entries; rather it functions to prevent the registers 36 from overflowing. Thus, the transactions are not prioritized but rather collected and distributed in an efficient manner. Although, the present invention illustrates one method of encoding entries, alternative logic may be utilized to produce similar results. For example, additional logic gates such as AND gates are generally implemented along with multiplexers to encode the transaction entries 32.

Figure 4:
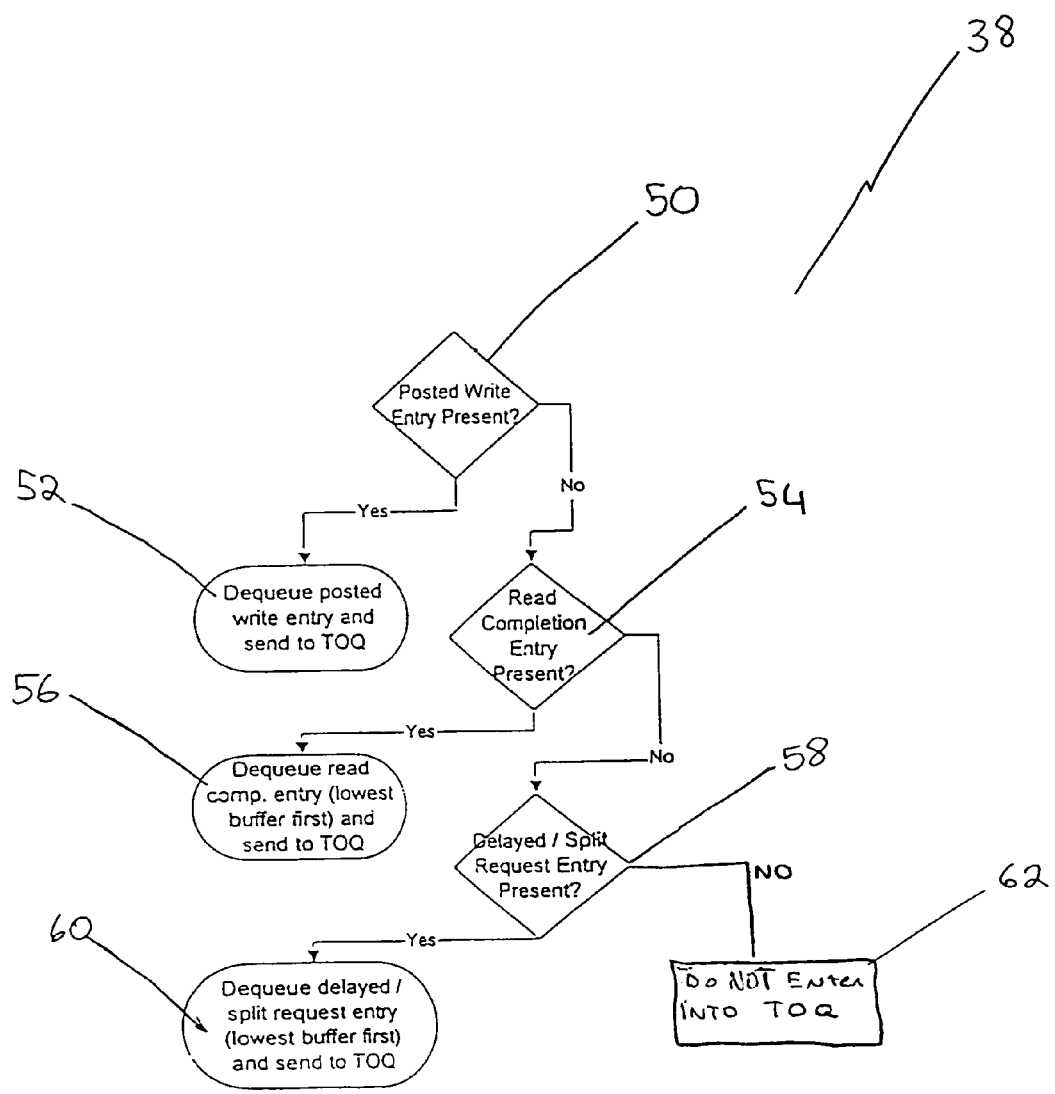
FIG. 4 illustrates a flowchart representing the steps for processing transaction entries in a transaction order queue utilizing an exemplary technique.

FIG. 4 illustrates a flowchart of the steps taken within the combinational decode and ordering logic device referenced by numeral 38 in FIG. 2. The primary purpose for the combinational decode and ordering logic device 38 is to select a single transaction entry 32 from the registers 36 to send to the transaction order queue as referenced by 42 in FIG. 2. Due to PCI-X ordering rules, posted write transactions are selected first to be enqueued. Thus, once the registers 36 store the transaction entry, it is prioritized accordingly by the combinational decode and ordering device 38, which orders the entries 32 according to PCI-X specifications. Once the entries 32 are prioritized, the combinational decode and ordering device 38 forwards the transaction entry 32 to the logic device 40 for enqueuing into the TOQ 42. The logic device 38 determines if a posted write entry is present (block 50). Thus, if the entry 32 is determined to be a posted write transaction, then the entry 32 is sent to the original transaction order queue (block 52). However, if the transaction entry 32 is determined not to be a posted write transaction, then the combinational decode and ordering device 38 determines whether the transaction entry is a read completion (block 54). If the combinational decode and ordering device 38 determines that the transaction entry is a read completion, then the transaction entry is transmitted to the transaction order queue 42 (block 56). Once the specific transaction entry 32 is enqueued according to priority, the registers 36 are cleared of the corresponding entry. It should be noted that for read completion transactions, the entry 32 may include additional bits that are required to store and retrieve data from the cachelines. If the transaction is determined not to be a read completion, then the combinational decode and ordering device 38 determines whether the transaction entry is a delayed/split transaction request (block 58). If the transaction is a delayed/split transaction request, then the transaction entry is transmitted into the transaction order queue 42 (block 60). However, if the transaction is not a delayed/split transaction request then no entry is sent to the TOQ (block 62).

Although, a specific ordering pattern is illustrated by the flowchart in FIG. 3, it should be known that various different ordering mechanisms may be adapted for any purpose necessary in the system 10. For example, the one clock cycle may also be adjusted according to PCI-X specifications necessary to achieve an efficient transaction order queue. Also, the logic devices in the enhanced feature may be configured to incorporate additional features to create a more efficient transaction order queue. Further, additional logic devices including logic to dequeue multiple transaction entries within one clock cycle, may be adapted.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for storing transaction entries in a transaction order queue, comprising the acts of:
   a) temporarily storing a plurality of transaction entries;
   b) prioritizing each of the plurality of temporarily stored transaction entries according to a bus standard, wherein prioritizing comprises the acts of:
      determining whether a posted write transaction entry is present;
      enqueuing the posted write transaction entry into the transaction order queue, if the posted write transaction entry is present;
      determining whether a read completion transaction entry is present, if the posted write transaction entry is not present;
      enqueuing the read completion transaction entry into the transaction order queue, if the read completion transaction entry is present;
      determining whether a delayed/split transaction entry is present, if the read completion transaction entry is not present; and
      enqueuing the delayed/split transaction entry into the transaction order queue;
   c) selecting one of the plurality of temporarily stored transaction entries; and
   d) enqueuing the selected one of the plurality of temporarily stored transaction entries into one of a plurality of storage locations in the transaction order queue according to an associated priority.

2. The method as recited in claim 1, wherein act (a) comprises the act of temporarily storing a plurality of transaction entries in a bank of registers.

3. The method as recited in claim 1, wherein the plurality of transaction entries are temporarily stored simultaneously.

4. The method as recited in claim 1, wherein acts (c) and (d) comprise the acts of
   determining whether a posted write transaction entry is present;
   if the posted write transaction entry is present, then enqueuing the posted write transaction entry into the transaction order queue,
   if the posted write transaction entry is not present, then determining whether a read completion transaction entry is present;
   if the read completion transaction entry is present, then enqueuing the read completion transaction entry into the transaction order queue;
   if the read completion transaction entry is not present, then determining whether a delayed/split transaction entry is present; and
   if the delayed/split transaction entry is present, then enqueuing delayed/split transaction entry into the transaction order queue.

5. The method as in claim 1, comprising the act of enqueuing each of the plurality of transaction entries into the transaction order queue one at a time during successive clock cycles.

6. A method of manufacturing a computer system for storing transaction entries in a transaction order queue comprising the acts of:
   providing a temporary storage space for temporarily storing a plurality of transaction entries;
   providing logic to prioritize each of the plurality of transaction entries according to a bus standard, wherein providing logic to prioritize comprises providing logic to:
      determine whether a posted write transaction entry is present;
      enqueue the posted write transaction entry into the transaction order queue, if the posted write transaction entry is present;
      determine whether a read completion transaction entry is present, if the posted write transaction entry is not present;
      enqueue the read completion transaction entry into the transaction order queue, if the read completion transaction entry is present;
      determine whether a delayed/split transaction entry is present, if the read completion transaction entry is not present; and
      enqueue the delayed/split transaction entry into the transaction order queue;
   providing logic to select one of the plurality of temporarily stored transaction entries; and
   providing a transaction order queue comprising a plurality of storage locations, wherein each of the plurality of storage locations is configured to receive the selected one of the plurality of temporarily stored transaction entries according to an associated priority determined by the prioritization logic.

7. The method as recited in claim 6, wherein the act of providing temporary storage space for temporarily storing a plurality of transaction entries comprises the act of providing a plurality of registers.

8. The method as recited in claim 7, wherein the act of providing logic to select one of the plurality of temporarily stored transaction entries comprises the act of providing logic for:
   determining whether a posted write transaction entry is present;
   if the posted write transaction entry is present, then enqueuing the posted write transaction entry into the transaction order queue;
   if the posted write transaction entry is not present, then determining whether the transaction is a read completion transaction entry;
   if the read completion transaction entry is present, then enqueuing the read completion transaction entry into the transaction order queue;
   if the read completion transaction entry is not present, then determining whether a delayed/split transaction entry is present; and
   if the delayed/split transaction entry is present, then enqueuing the delayed/split transaction entry into the transaction order queue.

9. An system for providing multiple simultaneous transaction entries to a transaction order queue comprising:
   means for temporarily storing simultaneously a plurality of transaction entries simultaneously;
   means for prioritizing each of the plurality of transaction entries according to a bus standard, wherein means for prioritizing comprises:
      means for determining whether a posted write transaction entry is present;
      means for enqueuing the posted write transaction entry into the transaction order queue, if the posted write transaction entry is present;

means for determining whether a read completion transaction entry is present, if the posted write transaction entry is not present;

means for enqueuing the read completion transaction entry into the transaction order queue, if the read completion transaction entry is present;

means for determining whether a delayed/split transaction entry is present, if the read completion transaction entry is not present; and means for enqueuing the delayed/split transaction entry into the transaction order queue;

means for selecting one of the plurality of temporarily stored transaction entries; and means for enqueuing the selected one of the plurality of temporarily stored transaction entries in one of a plurality of storage locations of a transaction order queue according to an associated priority determined by the prioritization means.

10. The system as in claim 9, wherein the means for temporarily storing a plurality of transaction entries comprises a bank of registers.

11. The system as in claim 9, wherein the means for selecting one of the plurality of temporarily stored transaction entries comprises:

means for determining whether a posted write transaction entry is present;

means for enqueuing the posted write transaction entry into the transaction order queue if the posted write transaction entry is present;

means for determining whether a read completion transaction entry is present, if the posted write transaction entry is not present;

means for enqueuing the read completion transaction entry into the transaction order queue if the read completion transaction entry is present;

means for determining whether a delayed/split transaction entry is present, if the read completion transaction entry is not present; and means for enqueuing the delayed/split transaction entry into the transaction order queue if the delayed/split transaction entry is present.

12. A system for providing multiple simultaneous transaction entries to a transaction order queue comprising:

a temporary memory storage adapted to store a plurality of transaction entries; and logic adapted for selecting and ordering the plurality of transaction entries in the transaction order queue according to a bus standard from the temporary memory storage for processing, wherein the transaction order queue comprises:

a plurality of storage locations;

logic adapted for determining whether a posted write transaction entry is present;

logic adapted for enqueuing the posted write transaction entry into the transaction order queue, if the posted write transaction entry is present;

logic adapted for determining whether a read completion transaction entry is present, if the posted write transaction entry is not present;

logic adapted for enqueuing the read completion transaction entry into the transaction order queue, if the read completion transaction entry is present;

logic adapted for determining whether a delayed/split transaction entry is present, if the read completion transaction entry is not present; and logic adapted for enqueuing the delayed/split transaction entry into the transaction order queue if the delayed/split transaction entry is present.

13. The system as in claim 12, wherein the temporary memory storage comprises a bank of registers.

14. The system as in claim 12, wherein the logic comprises:

logic adapted for determining whether a posted write transaction entry is present;

logic adapted for enqueuing the posted write transaction entry into the transaction order queue if the posted write transaction entry is present;

logic adapted for determining whether a read completion transaction entry is present, if the posted write transaction entry is not present;

logic adapted for enqueuing the read completion transaction entry into the transaction order queue if the read completion transaction entry is present;

logic adapted for determining whether a delayed/split transaction entry is present, if the read completion transaction entry is not present; and logic adapted for enqueuing the delayed/split transaction entry into transaction order queue if the delayed/split transaction entry is present.

15. The method as in claim 12, wherein each of the plurality of transaction entries is enqueued into the transaction order queue one at a time during successive clock cycles.

16. A processing system comprising:

a first logic device;

a plurality of registers being configured to receive a plurality of transaction entries from the first logic device;

a second logic device adapted to receive the transaction entries from the plurality of registers and being programmed to prioritize transaction entries according to PCI-X specifications;

a third logic device adapted to select the transaction entries from the plurality of registers according to an associated priority; and a transaction order queue comprising a plurality of storage locations, wherein the third logic device is configured to enqueue the transaction entries into the transaction order queue according to the associated priority, each of the plurality of storage locations being configured to receive and enqueue the selected transaction entries.

17. The processing system as in claim 16, wherein the first logic device receives transaction entries from an input source.

18. The processing system as in claim 16, wherein the plurality of registers store the plurality of transaction entries received from the first logic device.

19. The processing system as in claim 16, wherein the second logic device selects a single entry to send to the transaction order queue.

20. The processing system as in claim 19, wherein the second logic device comprises:

logic adapted for determining whether a posted write transaction entry is present;

logic adapted for enqueuing the posted write transaction entry into the transaction order queue if the posted write transaction entry is present;

logic adapted for determining whether a read completion transaction entry is present, if the posted write transaction entry is not present;

logic adapted for enqueuing the read completion transaction entry into the transaction order queue if the read completion transaction entry is present;

logic adapted for determining whether a delayed/split transaction entry is present, if the read completion transaction entry is not present; and logic adapted for enqueuing the delayed/split transaction entry into the transaction order queue if the delayed/split transaction entry is present.

21. The processing system as in claim 16, wherein the transaction order queue enqueues one transaction entry per clock cycle.

22. A computer system comprising:

at least one processor;

a memory device operatively coupled to the at least one processor; and a transaction order queue circuit configured to process transactions from the memory device, the transaction order queue circuit being adapted to encode a plurality of simultaneously received transaction entries according to an associated priority, and comprising a transaction order queue comprising a plurality of storage locations, wherein each of the plurality of storage locations is configured to store one of the transactions from the memory device, in an order according to the associated priority, and wherein the transaction order queue comprises:

logic adapted for determining whether a posted write transaction entry is present;

logic adapted for enqueuing the posted write transaction entry into the transaction order queue, if the posted write transaction entry is present;

logic adapted for determining whether a read completion transaction entry is present, if the posted write transaction entry is not present;

logic adapted for enqueuing the read completion transaction entry into the transaction order queue, if the read completion transaction entry is present;

logic adapted for determining whether a delayed/split transaction entry is present, if the read completion transaction entry is not present; and logic adapted for enqueuing the delayed/split transaction entry into the transaction order queue if the delayed/split transaction entry is present.

23. The system as in claim 22, wherein the computer system comprises network capabilities.

24. A method for storing transaction entries in a transaction order queue, comprising the acts of:

a) temporarily storing a plurality of simultaneously received transaction entries; and b) delivering the plurality of transaction entries to a transaction order queue one at a time, wherein each of the plurality of transaction entries is stored in a respective one of a plurality of storage locations in the transaction order queue, in an order according to an associated priority, and wherein delivering the plurality of transaction entries comprises the acts of:

determining whether a posted write transaction entry is present;

enqueuing the posted write transaction entry into the transaction order queue, if the posted write transaction entry is present;

determining whether a read completion transaction entry is present, if the posted write transaction entry is not present;

enqueuing the read completion transaction entry into the transaction order queue, if the read completion transaction entry is present;

determining whether a delayed/split transaction entry is present, if the read completion transaction entry is not present; and enqueuing the delayed/split transaction entry into the transaction order queue.

25. The method as in claim 24, wherein the plurality of simultaneous transaction entries is stored in a bank of registers.

26. A method for storing transaction entries in a transaction order queue, comprising the acts of:

a) temporarily storing a plurality of simultaneously received transaction entries;

b) prioritizing each of the temporarily stored transaction entries, comprising the acts of:

determining whether a posted write transaction entry is present;

enqueuing the posted write transaction entry into the transaction order queue, if the posted write transaction entry is present;

determining whether a read completion transaction entry is present, if the posted write transaction entry is not present;

enqueuing the read completion transaction entry into the transaction order queue, if the read completion transaction entry is present;

determining whether a delayed/split transaction entry is present, if the read completion transaction entry is not present; and enqueuing the delayed/split transaction entry into the transaction order queue; and c) transmitting the stored transaction entries to the transaction order queue according to priority, wherein each of the stored transaction entries is transmitted to a respective one of a plurality of storage locations in the transaction order queue.

27. The method as in claim 26, wherein the plurality of transaction entries are stored simultaneously in a bank of registers.

* * * * *

UNITED STATES PATENT AND TRADEMARK OFFICE
CERTIFICATE OF CORRECTION

PATENT NO. : 7,028,116 B2 Page 1 of 1
APPLICATION NO. : 09/779424
DATED : April 11, 2006
INVENTOR(S) : Paras A. Shah It is certified that error appears in the above-identified patent and that said Letters Patent is hereby corrected as shown below:

In column 7, line 41, in Claim 4, after "of" insert -- : --.

Signed and Sealed this

Twenty-sixth Day of May, 2009

JOHN DOLL
*Acting Director of the United States Patent and Trademark Office*